J. E. HANZLIK.
NEGOTIABLE INTEREST BEARING INSTRUMENT.
APPLICATION FILED NOV. 6, 1907.

967,016.

Patented Aug. 9, 1910.

Witnesses
W. E. Allen
G. M. Stucker

Inventor
John E. Hanzlik

By Eugene Cushman
and, Attorneys

UNITED STATES PATENT OFFICE.

JOHN EDW. HANZLIK, OF WONEWOC, WISCONSIN.

NEGOTIABLE INTEREST-BEARING INSTRUMENT.

967,016. Specification of Letters Patent. Patented Aug. 9, 1910.

Application filed November 6, 1907. Serial No. 400,990.

*To all whom it may concern:*

Be it known that I, JOHN EDWARD HANZLIK, a citizen of the United States, residing at Wonewoc, county of Juneau, State of Wisconsin, have invented a new and useful Negotiable Interest-Bearing Instrument, of which the following is a specification.

This invention relates generally to negotiable interest-bearing instruments of obligation, and relates more particularly to such instruments as embody a negotiable certificate of deposit of a given round principal sum, the instrument bearing date and interest-amount indicia for indicating the amount of interest accruing on the sum deposited for certain periods.

The principal object of my invention is to provide an instrument of this type with date indicia so arranged as to indicate at a glance the precise dates of commencement and endings of successive interest periods, and combining with such date indicia interest-amount indicia arranged to indicate the accrued interest amounts at successive interest periods, the date and interest amount indicia being relatively arranged, so as to cause the date indicia to serve as an index to the interest amount indicia.

A further object is to provide an instrument of the type above indicated with a detachable coupon in which the date and interest amount indicia are arranged in such manner as to permit the indicia of the coupon and of the instrument to be placed in superposed relationship to enable the selected indicia of one part to be duplicated in the other part, thereby enabling the coupon to act as a check on the validity of the instrument.

Other and further objects of the invention will be readily apparent as the invention is hereinafter described.

To these and other ends, my invention consists in the interest bearing certificate of obligation having the structural arrangement hereinafter described, illustrated in the accompanying drawings, and particularly pointed out in the appended claims.

In the accompanying drawings, the view illustrates a preferred embodiment of the invention with the coupon attached.

Referring more particularly to the drawings, 1 designates the certificate, and 2 the coupon, the latter being detachably connected to the certificate. The certificate has printed thereon such information as may be desired by the issuing bank, as for instance the amount for which the certificate has been issued and places for the signatures of the depositor, the president, and the cashier of the bank. At the left of this printed matter, is arranged the date and interest amount indicia which forms a permanent part of the certificate, and which serves to control the monetary or redemption value of the certificate at any predetermined interest period. This date and interest amount indicia is reproduced in the coupon in such manner that the coupon may be placed in superposed relationship to the certificate and enable simultaneous punching of the indicia on both parts, the punching provided a selected indication or indications duplicated in both structures or parts. As the indicia on both parts is the same, it will be necessary only to describe one of them, and for this purpose I have employed the indicia shown on the certificate. The indicia for the certificates may be arranged to meet various conditions. For instance, the interest periods may be arranged to provide for semi-annual, quarterly, or other interest dates; for the purpose of illustrating the manner of use, the drawings indicate the arrangement provided for semi-annual periods. The interest amount indicia may also be varied, the variations being dependent upon the rate of interest paid by the institution issuing the certificate; for instance, the blank shown in the drawings, is arranged on a basis of a gradually increasing rate of interest, the rate increasing until the maximum rate is reached, which rate is then continued during the remainder of the term; obviously the interest amounts indicated may be based on a constant rate without affecting the operation and use of the certificate.

Referring more particularly to the drawing, the date indicia (which, as heretofore pointed out, is arranged on a basis of semi-annual interest periods) comprises the month date indications, indicated at 6, and the month indications indicated at 4 and 5. The month date indications are arranged at the top of the indicia and present the dates in the form of columns of consecutive numerals running from 1 to 30. The particular arrangement of these consecutive numerals is im material, they serving merely to indicate the date of the month on which the interest periods are completed. The remainder of the date indicia is comprised in the month indications 4 and 5, these indications consisting of month names consecutively arranged in vertical columns, the number of columns corresponding to the number of interest periods in a year. For instance, where the interest periods are two in number, as indicated in the drawings, two columns are used, the first column containing the month names in consecutive order, running from January to June, both inclusive, while the second column, (indicated at 5) has the month names of the balance of the year consecutively arranged. Where the arrangement is to be in quarterly interest periods, the columns would be four in number, the first containing the month names from January to March, both inclusive, the second April to June, the third July to September, and the fourth October to December, all inclusive. Should the periods be three in number, three columns would be provided with the month names arranged in sequence running from the top of the first column to the bottom of that column and then to the top of the next column, and through that column, etc., each column having the same number of months. Obviously the same arrangement might be provided if the interest periods were bi-monthly, in which case six columns would be provided. For the purpose of providing fixed points for the placing of the seclected indications, I may place opposite the month named a suitable mark or indication, such as indicated at 4'. By this arrangement of date indicia, a punching of the proper numeral in the month date indicia and the punching of the indication 4' for the proper month, as for instance the date of issue of the certificate, there will be provided a punched indication not only of the date of issue, but in addition, the date of the completion or maturity of each interest period, the month date being the same in each case, while the month is indicated by the horizontal row of month names in which the punched indication therefor is located. For instance, in the drawing, the punchings are presumed to have been made to indicate November 9; this date indicates the date of issue and necessarily the date of maturity of the last interest period of the succeeding year, while the month of May, being located on the same horizontal line with the punched month November, indicates the date of maturity of the first interest period or the next one following the date of issue, the date of the month being the same in both months. Where the arrangement is made for a quarterly interest period the punching of the date November 9, would indicate the succeeding dates of maturity of interest periods as February, May, August, and November, these months named being located on the same horizontal line where the four columns are used.

The interest-amount indicia is positioned below the date indicia, the line which divides the columns 4 and 5, extending through the interest amount indicia, thereby continuing the columns through the interest amount indicia, these columns, in the drawing, being indicated at A and B, the particular arrangement of columns being employed for a particular purpose as presently described. The interest amount indicia is also divided by horizontal lines to group the number of columns of the month name indications, each group representing the interest periods of a single year, the first group containing one less row than the remaining group, since there is one less interest period in the year of issuance of the certificate than in the remaining years. In the drawings, the groups each contain two horizontal rows, with the exception of the upper group which contains but one, and at the left of the column indicated at A, are arranged the year indications indicated at 7, each year covering the group to which it appertains. Inasmuch as the upper year is intended to correspond with the year of issue of the certificate, these year indications are filled in at the time of issue, unless the number issued is sufficient to justify their being printed in. At the right of the column headed B the groups are similarly divided to provide spaces in which punched indications may be made, and in which spaces, suitable distinguishing indications may be employed, and which will serve as a guide between the vertical column and the horizontal row in any one year or all of the years, the drawing indicating this particular line of spaces at 8, and showing the distinguishing indications as $a'$ and $b'$, the distinguishing indication in each group being smilarly arranged, in order that a proper reading of the indicia may be had.

The columns of the interest amount indicia are adapted to contain permanent indications of interest amounts. As heretofore pointed out, the amount indicated in the drawings are not based on a fixed or constant rate, it being preferred to indicate a variation in rate for the purpose of showing the flexibility of the invention. These amounts, in the drawings represent an interest rate of two per cent. per annum for the first interest period of six months, a rate of three per cent. per annum for the second period of six months, and a rate of four per cent. per annum for the remaining periods, the certificate being issued for a fixed term, after which interest ceases.

In use, employing the punched date indicia as the basis, the interest amounts would be found in the horizontal rows $b'$, the month being positioned in the column indicated as B. As there are no further interest periods maturing in the year 1907, the first interest period matures in 1908, and the amount is found at the intersection of the column A with the row indicated as $b'$ in the group of the year 1908, the amount indicated being $1.00 (the certificate being presumed to represent the deposit of $100.00); the date of maturity of this period would be May 9, 1908, the name of this month occurring in the column indicated as A. The rate of interest now changes to three per cent., and when the next interest period matures, November 9, 1908, the amount of interest due is $3.00 as indicated by the intersection of column B, and the row $b'$ of the year 1908.
The next period matures on May 9, 1909, and the amount of interest will be found at the intersection of the column headed A with the row indicated as $b'$ under the year 1909, the amount being $6.00, which is based on a four per cent. interest rate; the next interest period matures on November 9, 1909, and the amount of interest due at that time is indicated as $8.00, found at the intersection of the column headed B with the row indicated as $b'$ under the year 1909. The interest amounts for the two periods in 1910 would be found at the intersection of the columns A and B with the row $b'$ under the year 1910. Were the date of issue to be located in the first column (that indicated as A) the first interest period would be in the same year, thereby making use of the upper row of the amount indicia indicated as $a'$, the succeeding periods having their amounts indicated at the intersection of the columns A and B successively and the rows indicated as $a'$ in the succeeding years. If desired, the proper indication in the column indicated as A, may be punched although this need not be done. By punching each indication, a safe-guard is provided, since it would require more manipulation to change the indicia.

As will be seen, the interest amount indicia provides a fixed indication of interest amount due at any one of a plurality of successive interest periods, at maturity of any of which the certificate may be taken up, and redeemed by the payment of the principal and the interest then due. And as the instrument is a negotiable one, this interest amount indicia will indicate the interest value of the certificate at any intermediate period, and enabling an equitable transfer of the certificate from one party to another without redemption. As will be readily understood, the instrument is not suitable for use where interest is payable at the end of each interest period without surrender of the certificate, the certificate requiring its being surrendered and redeemed when interest payments are made.

As will be readily understood, the date indicia, and particularly that of the month, serves as an index to the amount indicia, the relative positions of the two providing for this result.

Having thus described my invention, what I claim as new and desire to secure by Letters Patent is:—

1. An interest bearing certificate of obligation having date and interest amount indicia, the amount indicia comprising adjacent columns of fixed indications of interest amounts, the indications of each column being divided into groups, each group covering a time interval of definite length, the time intervals corresponding in position in each column, and index indicia for each group to indicate the particular amount indication covering the group.

2. An interest bearing certificate of obligation having date and interest amount indicia, the amount indicia comprising adjacent columns of fixed indications of interest amounts, the indications of each column being divided into groups, each group covering a time interval of definite length, the time intervals corresponding in position in each column, and index indicia for each group to indicate the particular amount indication covering the group, the amount indicia of successive groups having indications of progressively increasing interest amounts, the several group indexes combinedly forming indications of interest amounts due at any one of a plurality of fixed interest periods.

3. An interest bearing certificate of obligation having date and interest amount indicia, the amount indicia comprising adjacent columns of fixed indications of interest amounts, the indications of each column being divided into groups, each covering a time interval of a definite length, the time intervals corresponding in position in each column, a month indicia positioned with respect to the amount indicia to form one portion of an index to indicate a selected column of the amount indicia, and an independent index indicia for each group adapted to coöperate with the month indicia to selectively indicate an individual interest amount indication.

4. An interest bearing certificate of obligation having date and interest amount indicia, the date indicia including a predetermined number of columns each containing successive month names, said names being successively continued from one column to the next, each column containing the month names of a fixed interest period, the interest amount indicia comprising columns extending in continuity with the month columns, each amount column having fixed indications of the interest amounts due at successively increasing periods from the date of issue of the obligation.

5. An interest bearing certificate of obligation having date and interest amount indicia, the date indicia including a predetermined number of columns each containing successive month names, said names being successively continued from one column to the next, each column containing the month names of a fixed interest period, the interest amount indicia comprising columns extending in continuity with the month columns, each amount column having fixed indications of the interest amounts due at successively increasing periods from the date of issue of the obligation, and index indications coöperating with the month name indications to selectively indicate a predetermined interest amount indication.

6. An interest bearing certificate of obligation having date and interest amount indicia, the amount indicia comprising adjacent columns of fixed indications of interest amounts, the indications of adjacent columns being positioned in rows intersecting the columns at right angles, the indications of each column being divided into groups, each covering a time interval of a definite length, the time intervals corresponding in position in each column, the individual amount indicia of the columns progressively increasing in amount with each row, the individual amount indicia of a column in one row appearing in the preceding column of the succeeding row.

In witness whereof I have hereunto subscribed my name in the presence of two witnesses.

JNO. EDW. HANZLIK.

Witnesses:
L. H. HANZLIK,
J. S. HERLIHY.